(12) United States Patent
Bhat

(10) Patent No.: US 8,948,894 B2
(45) Date of Patent: Feb. 3, 2015

(54) METHOD OF SELECTIVELY INSERTING AN AUDIO CLIP INTO A PRIMARY AUDIO STREAM

(75) Inventor: Dinkar N. Bhat, Princeton, NJ (US)

(73) Assignee: Google Technology Holdings LLC, Mountain View, CA (US)

( * ) Notice: Subject to any disclaimer, the term of this patent is extended or adjusted under 35 U.S.C. 154(b) by 550 days.

(21) Appl. No.: 13/186,603

(22) Filed: Jul. 20, 2011

(65) Prior Publication Data

US 2013/0024016 A1 Jan. 24, 2013

(51) Int. Cl.
G06F 17/00 (2006.01)
G11B 27/038 (2006.01)
G11B 27/036 (2006.01)

(52) U.S. Cl.
CPC ............ *G11B 27/038* (2013.01); *G11B 27/036* (2013.01)
USPC ................................ 700/94; 704/270; 725/36

(58) Field of Classification Search
None
See application file for complete search history.

(56) References Cited

U.S. PATENT DOCUMENTS

| | | | |
|---|---|---|---|
| 5,822,018 A | 10/1998 | Farmer | |
| 5,918,223 A | 6/1999 | Blum et al. | |
| 7,305,696 B2 | 12/2007 | Thomas et al. | |
| 7,562,012 B1 | 7/2009 | Wold et al. | |
| 7,725,202 B2 | 5/2010 | Chen et al. | |
| 2005/0197724 A1 | 9/2005 | Neogi | |
| 2006/0092282 A1 * | 5/2006 | Herley et al. | 348/207.99 |
| 2008/0288255 A1 | 11/2008 | Carin et al. | |
| 2011/0122314 A1 | 5/2011 | Bhat et al. | |
| 2011/0142427 A1 | 6/2011 | Bhat et al. | |
| 2011/0295607 A1 * | 12/2011 | Krishnan et al. | 704/270 |

OTHER PUBLICATIONS

Molla et al., "Effectiveness of MFCCs and their Statistical Distribution Properties", Jul. 2004, IEEE conference Virtual Environments Human-Computer Interfaces and Measurement systems, pp. 136-141.*
Foote, "Content-Based Retrieval of Music and Audio", in Multimedia Storage and Archiving Systems II, Proc. SPIE, vol. 3229, pp. 138-147, (1997).*
Yuxin Peng, et al., "Audio Similarity Measure by Graph Modeling and Matching", Institute of Computer Science and Technology, Peking University, Beijing, Department of Computer Science, City University of Hong Kong, 2006.
Comparisonics Corporation, "The Comparisonics™ API Version 2.0", available at web.archive.org/web/19991009210554/http://www.comparisonics.com/api.html, retrieved Apr. 12, 2012, dated Oct. 9, 1999.
Civolution, "Digital Fingerprinting", available at www.civolution.com/technology/digital-fingerprinting/, dated 2010.

(Continued)

*Primary Examiner* — Fan Tsang
*Assistant Examiner* — David Siegel
(74) *Attorney, Agent, or Firm* — Birch, Stewart, Kolasch & Birch, LLP

(57) ABSTRACT

A method of processing audio signals in which an audio signature of a primary audio stream is compared to a set of audio signatures corresponding to a series of separate audio clips is disclosed. One of the audio clips from the series of separate audio clips is selected for insertion into the primary audio stream such that the selected audio clip has an audio signature that most closely matches the audio signature of the primary audio stream. The matching and selecting steps are performed by at least one signal processing electronic device.

13 Claims, 3 Drawing Sheets

(56) References Cited

OTHER PUBLICATIONS

Mediahedge, "Digital Fingerprinting: White Paper", available at www.civolution.com/fileadmin/bestanden/white%20papers/Fingerprinting%20-%20by%20Civolution%20and%20Gracenote%20-%202010.pdf, dated 2010.

Oded Yeruhami, et al., "Media Exposure Measurement using Audio Signature Generation & Matching", Signal and Image Processing Lab, Department of Electrical Engineering, Technion, Spring 2009.

Dinkar N. Bhat et al., "Ordinal Measures for Visual Correspondence", Department of Computer Science, Columbia University, Mar. 1997.

D. Bhat, et al., "Ordinal Measures for Image Correspondence," IEEE Trans. on Pattern Analysis and Mach. Intell., 20 (4):415-423, Apr. 1998.

M.F. McKinney, et al., "Features for Audio and Music Classification", Proceedings of the International Symposium on Music Information Retrieval (ISMIR) 2003, Baltimore, Maryland, USA, Oct. 2003, pp. 151-158.

* cited by examiner

METHOD OF SELECTIVELY INSERTING AN AUDIO CLIP INTO A PRIMARY AUDIO STREAM

FIELD

Processing of audio signals is described, and more particularly, the selection of an audio clip for insertion into a primary audio stream is described.

BACKGROUND

In cable television and other industries, the insertion of an audio clip into a primary audio stream may be required. Merely by way of example, an audio clip for a relatively short advertisement may be required to be inserted into the audio of a broadcast stream of a live or recorded program or like provided content. The audio of the inserted clip may sound significantly different to the ear of the listener relative to the audio of the primary broadcast stream and the transition from one to the other may be perceptibly dissonant. Although volume levels of the local audio clip and the audio of the broadcast stream may be matched and normalized, this may not cure the above referenced problem with respect to the transitions between the audio of the broadcast and the inserted clip.

Accordingly, there is a need for a method and system which enables an audio clip to be inserted into a primary audio stream such that a smooth transition as heard by the ear of the listener can be ensured between the inserted clip and the primary audio stream.

SUMMARY

This disclosure describes a method of processing audio signals in which an audio signature of a primary audio stream is compared to a set of audio signatures corresponding to a series of separate audio clips. One of the audio clips from the series of separate audio clips is selected for insertion into the primary audio stream such that the selected audio clip has an audio signature that most closely matches the audio signature of the primary audio stream. The matching and selecting steps are performed by at least one signal processing electronic device.

This disclosure also describes an electronic device for inserting a signal corresponding to an audio clip into a signal corresponding to a primary audio stream. The device has at least one signal processing module for generating an audio signature for at least one extracted segment of the primary audio stream, for comparing the audio signature with a plurality of audio signatures of a series of audio clips stored in memory, and for selecting an audio clip having an audio signature that most closely matches the audio signature of the at least one extracted segment of the primary audio stream for insertion into the primary audio stream.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

For purposes of example, a primary audio stream may be part of a broadcast stream over a network of a provider or may be from any external source or the like. For instance, program providers such as multiple system operators, television networks and stations, cable TV operators, satellite TV operators, studios, wireless service providers, and Internet broadcasters/service providers, among others, operate broadband communication systems enabling the delivery of video/audio programs and like multimedia content to consumers over networks or the like via digital or analog signals. In turn, consumer devices, such as set-top boxes (STBs), media centers, digital video recorders (DVR), personal computers (including desktop, lap top, tablet or pad computers), televisions, portable electronic devices (including smart phones), and like customer premises equipment (CPE) are adapted to receive and render delivered multimedia content typically via an associated display monitor and/or speakers.

Figure 1:
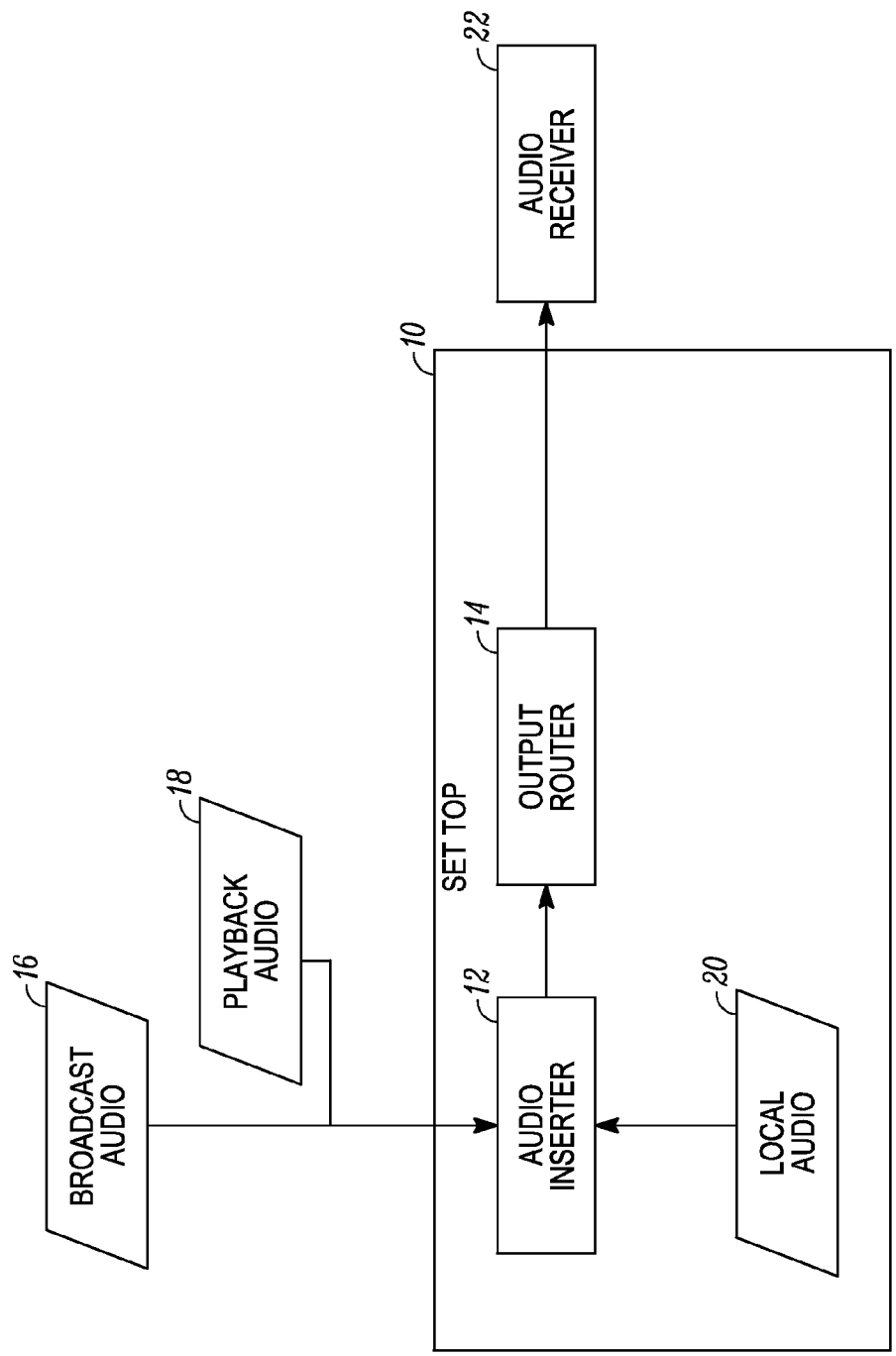
FIG. 1 is a block diagram that illustrates one contemplated embodiment of a signal processing electronic device for inserting an audio clip into a primary audio stream.

At any of various locations in the above referenced systems, a signal processing electronic device may be used to insert audio clips into a primary audio stream. For instance, this component could be equipment operated by the service provider or could be customer premises equipment (CPE), such as a set top box (STB) 10 shown in FIG. 1. Typically, the STB 10 such as shown in FIG. 1 will be connected to a display monitor (not shown), such as a high definition digital television or the like, on which video and audio can be played so that a desired program (live or recorded) can be viewed by the end user. The STB 10 could form an integral part of the television or could form a part of some other CPE device. Thus, the above described arrangement is provided by way of example only, and other arrangements, equipment, and the like are contemplated.

As shown in FIG. 1, the STB 10 may include an audio inserter module 12 and an output router 14 for handling audio signals and streams. During use, the audio inserter module 12 may receive a stream of primary audio, such as a broadcast stream, input from broadcast audio 16, playback audio 18, or local stored audio clips 20. These sources could be external of the STB 10 or internal, particularly in the case of local stored audio clips 20. For example, the stored audio clips 20 could be stored on a remote or local server. The audio inserter module 12 includes a port that connects its output to the output router 14. Thus, when the audio inserter module 12 receives broadcast audio 16 or playback audio 18, the audio inserter unit 12 forwards the broadcast audio 16 or playback audio 18 to the output router 14 which transmits the broadcast audio 16 or playback audio 18 over an output port to an audio receiver 22, such as an audio receiver of a television or other CPE or like device. As another alternative, the output router 14 could transmit the broadcast audio 16 or playback audio 18 to a DVR or like recording or storage device.

When the audio inserter module 12 is required to insert local audio 20 into the audio stream of the broadcast audio 16 or playback audio 18, the audio inserter module 12 temporarily discontinues transmitting the broadcast audio 16 or playback audio 18 to the output router 14 and replaces it with an inserted local audio 20. The output router 14 then transmits the local audio 20 over its output port to the audio receiver 22 or to a DVR or like recording or storage device. In this manner, the local audio, such as an audio clip relating to an advertisement or the like, can be inserted into the broadcast or other primary audio stream.

In some cases, it may be desirable to provide and ensure smooth transitions as heard by the ear of the listener between the audio of the inserted clip and the audio of the primary audio stream. A smooth transition is not merely directed at matching or normalizing volume levels; rather, a smooth transition is provided when the audio clip sounds similar, although not identical, to the primary audio stream as heard by the ear of the listener.

One contemplated embodiment of such a system may include a device, such as STB 10, that includes an audio inserter module 12 which selects an appropriate local audio clip from a series of remotely or locally stored audio clips that most closely matches the audio signature of the primary audio stream for insertion into the primary audio stream. For example, the series of audio clips could be local advertisements to be played during commercial segments of a primary broadcast stream. The series of audio clips could be stored on a local or remote server and could provide the same advertisement (with the same video) with the exception that the audio of each clip is different. For instance, the genre of background music or the like could be different in each audio clip thereby providing each of the stored local audio clips with a different sound or audio signature. In this way, the audio inserter module 12 can match the audio from the primary broadcast stream with the audio from the series of stored clips and select the clip that has an audio signature most similar to the audio signature of the broadcast stream. The result is smoother transitions between the sounds of the primary audio and the sounds of the inserted audio clip as heard by the ear of the listener.

Figure 2:
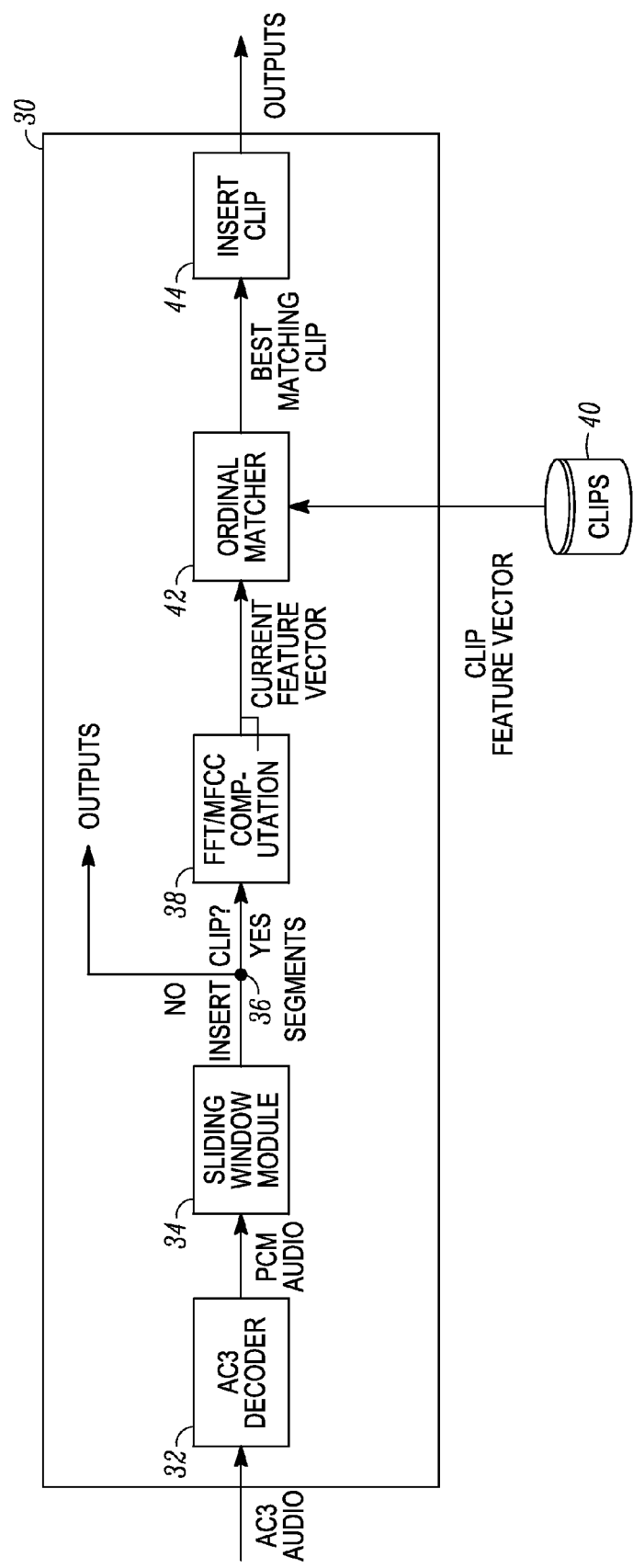
FIG. 2 is a flowchart that illustrates a method for inserting a best matching audio clip into a primary audio stream.
Figure 3:
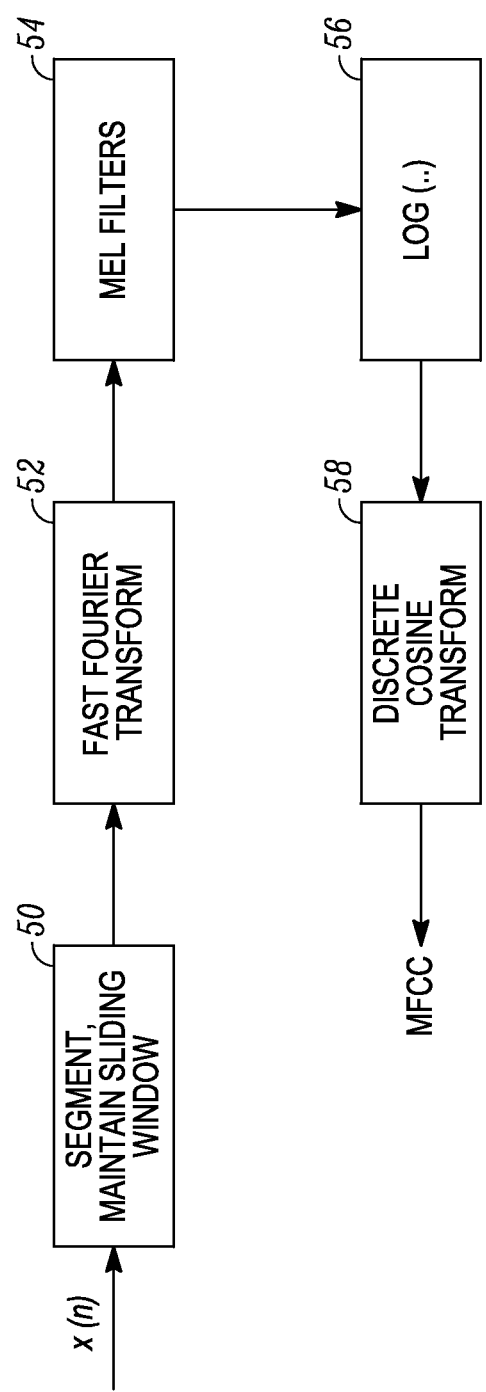
FIG. 3 is a flowchart demonstrating the computation of feature vectors used to determining a best matching audio clip for insertion into the primary audio stream.

For purposes of matching audio signatures, an arrangement such as shown in FIG. 2 can be utilized. All or parts of this arrangement may be used or triggered only during a time very close to when a clip is required to be inserted into the broadcast stream. Thus, at least parts of the process and algorithm applied as shown in FIGS. 2 and 3 may not need to be applied continuously throughout the duration of the primary audio stream; rather, at least parts of the process and algorithm applied by the apparatus may need only be applied, triggered or used during a timeframe very close to clip insertion time.

Further, primary broadcast signals or the like as well as advertisement clips will include video signals. The video signals are not used for matching audio signatures. Thus, the audio signals are processed separate from the video signals and this may require that the audio stream be demultiplexed from the video as a first step.

The device 30 has a decoder 32 for receiving and decoding a stream of audio provided from an external source. For example, the compression format of the audio may be Digital Dolby Audio (AC3) and the decoder 32 may be an AC3 decoder. Of course, other signal formats and types of decoders can be utilized. For instance, Dolby Digital Audio (AC3) provides five full-bandwidth channels including front left, front right, center, surround left, and surround right to provide true surround sound quality. Dolby Digital Audio (AC3) further includes a low frequency effect (LFE) channel that provides sound needed for special effects and action sequences in movies and the like. The LFE channel is one-tenth of the bandwidth of the other channels. Thus, Dolby Digital Audio (AC3) is a multichannel scheme referred to as 5.1 channel. However, the signal format could also be a mono signal (1 channel) or a stereo signal (2 channel).

The decoder 32 may receive the AC3 audio or an audio stream of any number of channels (i.e., mono, stereo, 5.1, etc.) and output audio in the form of pulse code modulation (PCM) audio to a sliding window signal processing module 34. If the audio stream is more than one channel, various strategies can be used to process the audio stream so that the segments to be extracted are handled consistently. For instance, a multichannel audio stream can be downmixed to a single channel after decoding, or only a center channel can be used for purposes of extracting segments for processing. A still further alternative is to downmix to two channels and then select the left channel only for use in extracting segments. Any approach can be adopted provided that the same approach is used consistently when processing primary audio stream and local audio clips for purposes of matching audio signatures.

The sliding window module 34 defines the size of the sliding window, or frames, of audio segments that is to be extracted from the decoded primary audio stream. The number of segments or samples extracted is typically a multiple of two since the extracted segments will be subject to a computation of the Fast Fourier Transform (FFT). The size or duration of each extracted segment can be derived from the sample size and the audio sampling frequency. Solely for purposes of example, the duration of each segment (or window, or frame) may be about 21 ms where the sample size is 1024 and the sampling frequency is 48 Khz. Of course, different durations, sample sizes and sampling frequencies can be utilized.

A switch or the like (not shown) at location 36 in FIG. 2 outputs the primary audio stream from the device 30 at times when no clip is to be inserted. However, when a clip is to be inserted, the switch (not shown) directs the output of the sliding window module 34 to a FFT/MFCC Computation Module 38. This module is used to compute an audio feature vector for the current set of segments in a sliding window. The feature vector is based on Mel Frequency Cepstral Coefficients (MFCCs) which are coefficients that are used to represent audio. The coefficients are derived from a cepstral representation of the set of segments in a sliding window. The difference between the cepstrum and the mel-frequency cepstrum (MFC) is that the frequency bands in the MFC are positioned logarithmically on the mel-scale which approximates the human auditory response better than linear-spaced frequency bands obtained directly from Fast Fourier Transform (FFT) or Discrete Cosine Transform (DCT). Thus, MFCCs are effective for audio classification, speech recognition, speaker recognition and the like.

FIG. 3 represents an example of the computation performed by the FFT/MFCC Computation Module 38 for each windowed excerpt of an audio signal. In FIG. 3, "x(n)" refers to discrete sampled audio data from a decoded audio stream. By way of example, the audio data could represent data of the PCM audio output from AC3 decoder 32 in a currently tuned channel. Audio segments are extracted sequentially from the x(n) data (at step 50) and for each segment the Fast Fourier Transform (FFT) is calculated (at step 52). For purposes of computing the FFT over a set of audio samples, a windowing function such as the Hamming Window can be applied to the raw audio data. Mel filters are applied (at step 54) to the computed FFT of the segment followed by Log transform (at step 56). The Discrete Cosine Transform (DCT) is applied to the mel log-amplitudes to produce a MFCC vector of the segment (at step 58). The MFCCs are the amplitudes of the spectrum resulting from the above computation. This computation can be accomplished in real-time or with expected delays. For purposes of this disclosure, "real-time" includes a level of responsiveness that is sufficiently fast, for instance, to keep up with the audio stream being received by decoder 32 as well as a level of responsiveness that tolerates a degree of lateness or built-in delay.

After the FFT/MFCC Computation Module 38 calculates the MFCCs for a segment of audio, the module 38 discards the first MFCC because this merely represents an average audio level in the window and is not used to determine the feature vector. The module 38 then computes the average of each of the remaining MFCCs over the set of current segments in the sliding window to generate an MFCC vector for the primary audio stream. Hereinafter, this is referred to as the "current MFCC feature vector".

Referring again to FIG. 2, if a clip is to be inserted into the primary audio stream, such as by a splicing operation or the like, the current MFCC feature vector is compared to a series of audio clips stored in database 40. The MFCC feature vector of each of the local audio clips are pre-computed and an Ordinal Matcher module 42 is used to perform the function of selecting the audio clip in database 40 that best matches the primary audio stream by matching the MFCC feature vectors.

The Ordinal Matcher module 42 does not use cardinal values to match the MFCC vectors or coefficients; rather, the module 42 uses an ordinal scale to match MFCC vectors or coefficients. An ordinal variable is one drawn from a discrete ordered set. Here, the ratio between two measurements or coefficients is not considered. Rather, only the relative ordering is relevant as expressed by their ranking. A rank permutation for each MFCC feature vector is obtained by sorting the measurements or coefficients of a sample and labeling them using integers [1, 2, ..., n], where "n" is the size of the sample (i.e., number of coefficients). Thus, the MFCCs are viewed in terms of ordinal variables.

For purposes of example, the ranking described above can be applied as follows. If the current MFCC feature vector from the primary audio stream is "U" of sample size "n", then the current MFCC feature vector calculated by FFT/MFCC Computation module 38 can be represented as $U=(U_1, U_2, U_3, \ldots U_n)$. When this is ordered as discussed above, the ranked vector of U will be $(S_1, S_2, S_3, \ldots S_n)$ where $S_i$ denotes the rank of the MFCC coefficient $(U_i)$ within U. As a specific example, assume "n" equals three and U=(2.5, 2.1, 3.4). Thus, the calculated coefficients of U provided by the FFT/MFCC Computation module 38 are 2.5, 2.1 and 3.4. The ranked vector determined by the Ordinal Matcher module 42 would then be (2, 1, 3) because 2.1 is the lowest coefficient value and is thus ranked as "1", 2.5 is the next highest coefficient value and is thus ranked as "2", and 3.4 is the highest coefficient value and is thus ranked as "3". Thus, the ranked vector of (2, 1, 3) is used by the Ordinal Matcher module 42 to compare with similar ranked vectors of the audio clips.

Accordingly, a similar "ranked vector" is provided for each of the stored local audio clips in database 40. The ranked vectors of the clips would be of the same sample size "n" (i.e., number of coefficients) as the ranked vector (U) of the primary audio stream. Thus, matching of the cardinal values of the MFCC feature vectors of coefficients are not used; rather, the sets of rankings of coefficients are used. This matching is referred to as ordinal measures of correspondence. In the above provided specific example of the ranked vector of U being (2, 1, 3), a stored clip having a ranked vector of (2, 1, 3) would be selected for insertion as a best match as opposed to ranked vectors of (1, 2, 3), (1, 3, 2), (2, 3, 1), (3, 1, 2) and (3, 2, 1). If an exact match is not available, then the closest match would be selected.

Thus, an ordinal scale is used to match the current MFCC feature vector calculated by the module 38 with the MFCC feature vectors of audio clips stored in database 40. This enables an audio clip to be selected from a series of different audio clips. The selected audio clip does not exactly match the broadcast audio stream; rather, the selection of an audio clip that sounds similar to the broadcast audio stream to the ear of the listener is selected. Thus, the audio clip having an audio signature that matches the audio signature of the primary audio stream in an ordinal sense is the audio signal that is selected by the Ordinal Matcher module 42. Here, provided the MFCC vectors have similar ordered rankings as described above, a good match is provided even if the calculated MFCC values are different. Similar ordered rankings of coefficients as discussed above provide a means for selecting an audio clip that will provide smooth transitions to the ear of the listener with a primary audio stream.

Accordingly, the Ordinal Matcher module 42 determines the rank permutations of the current MFCC feature vector provided by module 38 and of the clips in database 40 being considered for insertion. Thereafter, the rank permutations are matched such that the clip with the closest matching rank permutations is selected for insertion in the primary audio stream. The clip is inserted by the Insertion module 44 and is then output to an output router, audio receiver, or the like. Thus, the selected clip is played and then followed by another selected audio clip or the primary audio stream.

By way of example, the primary audio stream may be a program with respect to a performance of an orchestra playing a musical selection of Mozart. The series of audio clips for insertion into the primary audio stream may be directed to an advertisement for a particular product or service. The different audio clips may contain background music or other sound effects of different genre, such as rock-and-roll, country music, and the like. The device 30 discussed above would ensure that an audio clip inserted into the broadcast audio stream provides a smooth transition and sounds similar to the broadcast audio stream. For instance, the background music of the advertisement may be classical music or the like and would not be rock-and-roll or country music which may sound dissonant with the broadcast audio stream.

The devices, units, modules and database storage discussed above can physically be provided on a circuit board or within an electronic device and can include various processors, microprocessors, controllers, chips, disk drives, and the like. It will be apparent to one of ordinary skill in the art that the modules, processors, controllers, units and the like may be implemented as electronic components, software, hardware or a combination of hardware and software.

While the principles of the invention have been described above in connection with specific devices, systems, and methods, it is to be clearly understood that this description is made only by way of example and not as limitation on the scope of the invention as defined in the appended claims.

I claim:

1. A method of processing audio signals, comprising:
computing Mel Frequency Cepstral Coefficients (MFCC) feature vectors of a primary audio stream and of a series of separate audio clips;
forming ranked vectors from the MFCC feature vectors of the primary audio stream and the series of separate audio clips, wherein the ranked vectors respectively rank coefficients on an ordinal scale within each of the MFCC feature vectors;

comparing the ranked vector of the primary audio stream with the ranked vectors of the series of separate audio clips; and selecting an audio clip for insertion into the primary audio stream from the series of separate audio clips based on results of said comparing step such that a selected audio clip has an audio signature that most closely matches an audio signature of the primary audio stream;

said computing, forming, comparing, and selecting steps being performed by at least one signal processing electronic device.

2. A method according to claim 1, further comprising extracting audio segments from the primary audio stream during a time period closely before an audio clip is to be inserted into the primary audio stream;

said computing step computing the MFCC feature vector of the primary audio stream from the audio segments.

3. A method according to claim 2, wherein in said selecting the audio clip having an audio signature that most closely matches the audio signature of the primary audio stream is the audio clip having one of the plurality of ranked MFCC feature vectors coefficients most similar in order to the ranked MFCC feature vector coefficients of the primary audio stream.

4. A method according to claim 2, wherein, said step of computing the MFCC feature vector of the primary audio stream includes:

computing Fast Fourier Transform (FFT) for each of the extracted audio segments; applying mel filters and Log transform to the computed FFT for each of the extracted audio segments to produce a list of mel log-amplitudes for each of the extracted audio segments; and computing Discrete Cosine Transform (DCT) of each of the lists of mel log-amplitudes to produce MFCC feature vectors for each of the extracted audio segments.

5. A method according to claim 4, further comprising discarding a first listed coefficient of each of the MFCC vectors; and after said discarding computing an average of each of the MFCC vectors to produce the MFCC feature vector of the primary audio stream.

6. A method according to claim 4, wherein the MFCC feature vector of the primary audio stream is determined in substantially real-time by the at least one signal processing electronic device and the MFCC feature vector of each of the audio clips is pre-calculated and stored in memory accessible by the at least one signal processing electronic device.

7. A method according to claim 1, further comprising splicing the selected audio clip into the primary audio stream.

8. A method according to claim 1, wherein the at least one signal processing electronic device is selected from a group consisting of consumer premises equipment, a set-top box, a digital television, a personal computer, a desktop computer, a laptop computer, a pad or tablet computer, a media player, and a smart phone.

9. An electronic device for inserting a signal corresponding to an audio clip into a signal corresponding to a primary audio stream, comprising:

at least one signal processing module for computing Mel Frequency Cepstral Coefficients (MFCC) feature vectors of the primary audio stream and of a series of separate audio clips; forming ranked vectors from the MFCC feature vectors of the primary audio stream and the series of separate audio clips, wherein the ranked vectors respectively rank coefficients on an ordinal scale within each of the MFCC feature vectors; comparing the ranked vector of the primary audio stream with the ranked vectors of the series of separate audio clips; and selecting an audio clip for insertion into the primary audio stream from the series of separate audio clips based on results of said comparing step such that a selected audio clip has an audio signature that most closely matches an audio signature of the primary audio stream.

10. An electronic device according to claim 9, wherein said at least one signal processing module includes a module for defining a size of sliding window of audio segments to be extracted sequentially from the primary audio stream.

11. An electronic device according to claim 9, wherein said at least one signal processing module includes a decoder for receiving said primary audio stream and for outputting a pulse code modulated audio signal.

12. An electronic device according to claim 9, further comprising an output router for outputting the primary audio stream with a best matching audio clip inserted therein.

13. An electronic device according to claim 9, wherein the electronic device is selected from a group consisting of consumer premises equipment, a set-top box, a digital television, a personal computer, a desktop computer, a laptop computer, a pad or tablet computer, a media player, and a smart phone.

* * * * *